(12) United States Patent
Wang et al.

(10) Patent No.: US 10,778,573 B2
(45) Date of Patent: Sep. 15, 2020

(54) GENERATING A SET OF RULES CORRESPONDING TO AN INTERNET PROTOCOL FLOW USING A REFLECTION MODE

(71) Applicant: Hewlett Packard Enterprise Development LP, Houston, TX (US)

(72) Inventors: Shuai Wang, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/310,575

(22) PCT Filed: Jun. 16, 2016

(86) PCT No.: PCT/CN2016/085998
§ 371 (c)(1),
(2) Date: Dec. 17, 2018

(87) PCT Pub. No.: WO2017/214927
PCT Pub. Date: Dec. 21, 2017

(65) Prior Publication Data
US 2019/0342207 A1    Nov. 7, 2019

(51) Int. Cl.
*H04L 12/781* (2013.01)
*H04W 24/08* (2009.01)
(Continued)

(52) U.S. Cl.
CPC ............. *H04L 45/52* (2013.01); *H04W 24/08* (2013.01); *H04W 40/02* (2013.01); *H04W 80/04* (2013.01); *H04W 88/16* (2013.01)

(58) Field of Classification Search
CPC ......... H04L 45/00; H04L 45/04; H04L 45/06; H04L 45/16; H04L 45/52; H04L 45/741;
(Continued)

(56) References Cited

U.S. PATENT DOCUMENTS 9,282,487 B2    3/2016   Sun et al.
2012/0099601 A1  4/2012   Haddad et al.
(Continued)

FOREIGN PATENT DOCUMENTS

| CN | 104902518 | 9/2015 |
| EP | 2709418 | 3/2014 |
| WO | WO-2012/139478 A1 | 10/2012 |
| WO | WO-2012/142437 A1 | 10/2012 |

OTHER PUBLICATIONS

"3GPP TR 23.861 Network based IP flow mobility", V13.0.0, Release 13, Jun. 2015, 153 pages.
(Continued)

*Primary Examiner* — Kan Yuen
(74) *Attorney, Agent, or Firm* — Hewlett Packard Enterprise Patent Department

(57) ABSTRACT

Certain implementations of the present disclosure relates to a network device that receives an Internet Protocol (IP) flow and determines a protocol type of wireless communication networks associated with a particular network on which the IP flow is transmitted to the network device. Then, the network device generates, using a reflection mode, a set of rules corresponding to the IP flow based on the protocol type of wireless communication networks. Next, the network device transmits the IP flow and the set of rules to another network node.

15 Claims, 8 Drawing Sheets

(51) Int. Cl.
*H04W 40/02* (2009.01)
*H04W 80/04* (2009.01)
*H04W 88/16* (2009.01)

(58) Field of Classification Search
CPC ... H04L 49/25; H04L 65/1013; H04L 65/102;
H04W 24/08; H04W 40/00; H04W 40/02;
H04W 80/04; H04W 84/02; H04W 84/04;
H04W 84/10; H04W 84/12; H04W 88/00;
H04W 88/10; H04W 88/16; H04W 92/00;
H04W 92/02; H04W 92/04; H04W 92/08;
H04W 92/16
See application file for complete search history.

(56) References Cited

U.S. PATENT DOCUMENTS

| | | |
|---|---|---|
| 2014/0086177 A1 | 3/2014 | Adjakple et al. |
| 2015/0036672 A1 | 2/2015 | Kim et al. |
| 2015/0327153 A1* | 11/2015 | Tervonen .............. H04W 48/08 370/235 |
| 2019/0014529 A1* | 1/2019 | Karampatsis ......... H04W 76/12 |

OTHER PUBLICATIONS

A. Schumacher and J. Schlienz, "WLAN Traffic Offload in LTE," Nov. 22, 2012, pp. 1-32, White Paper, Rohde & Schwarz GmbH & Co. KG.

International Searching Authority, The International Search Report and the Written Opinion. dated Mar 1, 2017, PCT/CN2016/085998, 12 Pgs.

\* cited by examiner

```
#    HOST NAME (PORT/SERVICE IF ENABLED)
                                                              ┌─510─┐
-----------------------------------------------------------------------
1    192.168.3.103:39257 => 192.168.1.10:80: (UPLINK TO LTE )
     → PGW REDIRECTS DOWNLINK TO LTE:
         192.168.3.103:39257 <= 192.168.1.10:80  ~520
2    192.168.3.103:39238 => 192.168.1.10:80: UPLINK TO LTE
     → PGW REDIRECTS DOWNLINK TO LTE:
         192.168.3.103:39238 <= 192.168.1.10:80
3    192.168.3.103:39265 => 192.168.1.10:80: UPLINK TO WLAN
     → PGW REDIRECTS DOWNLINK TO WLAN:
         192.168.3.103:39265 <= 192.168.1.10:80   ~530
4    192.168.3.103:39262 => 192.168.1.10:80: (UPLINK TO WLAN)
     → PGW REDIRECTS DOWNLINK TO WLAN:
         192.168.3.103:39262 <= 192.168.1.10:80  ~540

… # GENERATING A SET OF RULES CORRESPONDING TO AN INTERNET PROTOCOL FLOW USING A REFLECTION MODE

BACKGROUND

Enterprise wireless network infrastructure can boost enterprise Information Technology (IT) productivity. The enterprise connectivity shall satisfy the emerging needs of guaranteed Quality of Services (QoS) with ever-increasing bandwidth demands for various applications, and at the same time supporting continuity, simplicity, security, etc. These technical expectations may suggest a hybrid enterprise access network that empowers, e.g., Long Term Evolution (LTE), Wireless Local Area Network (WLAN) and/or Worldwide Interoperability for Microwave Access (WiMAX) serving in parallel.

BRIEF DESCRIPTION OF THE DRAWINGS

The following detailed description references the drawings, wherein:

FIG. 5 is a block diagram illustrating example operations by the PGW in the reflection mode;

DETAILED DESCRIPTION

Figure 1:
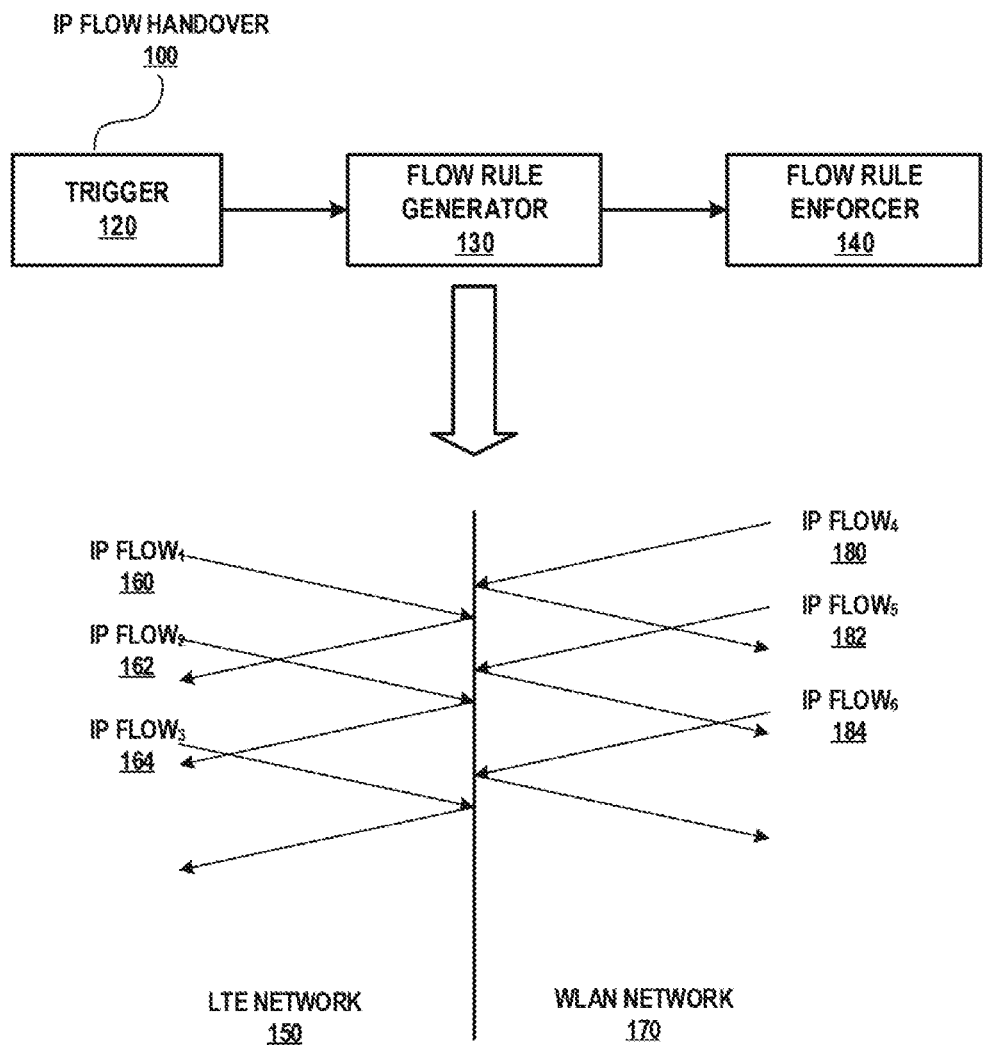
FIG. 1 is a block diagram of an example best effort transmission scenario handled by a packet data network (PDN) gateway (PGW) using a reflection mode.

In the following description, details are presented to provide a detailed description. Concepts and techniques disclosed herein can be practiced without specific details, or in combination with other components, etc. As used herein, the term "implementation" generally refers to an implementation that serves to illustrate by way of example but not limitation. It should be understood that this disclosure covers all modifications, equivalents, and alternatives falling within the spirit and scope of the present disclosure.

Overview

Certain implementations of the present disclosure relates to improvement of Internet Protocol (IP) flow mobility. In particular, certain implementations of the present disclosure relates to generating a set of rules corresponding to an IP flow using a reflection mode.

The 3rd Generation Partnership Project (3GPP) is a collaboration between groups of telecommunications associations. The scope of 3GPP includes the development and maintenance of: Global System for Mobile Communications (GSM) and related "2G" and "2.5G" standards; Universal Mobile Telecommunications System (UMTS) and related "3G"; Long-Term Evolution (LTE) and related "4G" standards; an evolved IP Multimedia Subsystem (IMS) developed in an access independent manner; etc. In addition, 3GPP standards define an IP Flow Mobility (IFOM), which allows cellular operators to offload certain traffic over, e.g., wireless local area network (WLAN), in a seamless manner.

Certain implementations of the present disclosure presents an acceleration approach, hereinafter referred to as "reflection," for best effort transmission of multiple flows under IFOM-based enterprise access network. With the goal of utilizing all available network bandwidth and accelerating the transmission speed for best effort application scenarios, operations in the reflection mode may have many advantages. For example, it can be used as a transmission acceleration approach for IP flow mobility solution. It can achieve higher transmission speed than a pure LTE network and/or a pure WLAN network. It focuses on generation and enforcement of IP flow rules for best effort transmission, and supports any triggers that can be applied to a user equipment (UE) and a packet data network (PDN) gateway (PGW). It balances the IP flows between the UE and the PGW for both uplink and downlink communications to utilize the available bandwidth on multiple access networks. Moreover, it arranges and routes multiple IP flows on enterprise access network in a timely manner without tedious flow rules provision. During operations in the reflection mode, simple real time signaling is used at the application level between the UE and the PGW.

Best Effort Transmission in Enterprise Access Network

Among various application scenarios, the best effort transmission is quite common and generates majority of the traffic on the user equipment. Also, users are generally more sensitive to the experience on the best effort network transmission, e.g., download speed, upload speed, etc.

Below are some sample best effort transmission scenarios that likely occur in the enterprise access network:

(1) Best effort video stream buffering for both real time streaming and Video On-Demand (VOD) playback. Here, the video and audio are transmitted as separate IP flows. The best effort transmission is used to achieve high resolution under Scalable Video Codec (SVC) based streaming, because a high speed (or a large bandwidth) corresponds to better video resolution. Also, the best effort transmission is used to achieve smoothness in video playback, e.g., during accelerated playback using ×2, ×4 speed, etc.

(2) Downloading or uploading an urgent large data file, such as, a critical upgrade package, via a network protocol (e.g., HTTP, FTP, etc.). The best effort transmission may use multiple threads and configure resuming at break-points.

(3) Web browsing with large downloading contents, such as, HTML5 games requiring a variety of resources (e.g., pictures, video, audio, JavaScript, CSS files, etc.). The size of such resources usually is more than tens of megabytes. Thus, the web browser usually opens multiple IP flows for downloading these contents.

In the above scenarios, best effort transmission generally corresponds to higher transmission speed, therefore larger bandwidth, than other transmissions. It usually happens and ends in multiple parallel IP flows. Because the IP flow mobility based enterprise access network may only provide a fundamental infrastructure for connectivity, many challenges in network traffic optimization may be solved with additional strategies on policies or rules provision. For example, these challenges include:

(1) IP flows created by a single application is restricted to a single access network so as to take advantage of the available bandwidth from the multiple access networks, e.g., both the WLAN and the LTE.

(2) The IP flows, which usually is represented by five-tuple items, e.g., {source IP address, source port, destination IP address, destination port, protocol}, are hard to predict before they are actually created.

(3) It is difficult to add a rule for each IP flow due to the large number of IP flows being created and their short life cycle (e.g., during web browsing).

(4) IP flow rule enforcement needs to be kept efficient between the UE and the PGW to avoid the unnecessary overhead.

(5) Best effort transmission needs to remain flexible; and, on-demand shall be guaranteed while approaching the acceleration on the best effort transmission.

(6) Minimal changes shall be made to both mobile devices and network infrastructure to allow easy deployment and maintenance.

The PGW disclosed herein handles the acceleration on the best effort transmission while taking the above challenges into consideration.

IP Flow Handover

FIG. 1 is a block diagram of an example best effort transmission scenario handled by a packet data network (PDN) gateway (PGW) using a reflection mode. Specifically, FIG. 1 illustrates an IP flow handover 100 of a user equipment (UE) at an example PGW in a hybrid network that includes a trigger component 120, a flow rule generator component 130, and a flow rule enforcer component 140.

The UE can include two logical sub-components: a signaling module and a routing module that may be used to carry out the seamless handover operations of flow routing and bi-directional signaling in the application layer. Specifically, the UE can be a mobile device that is capable of performing end-to-end bidirectional signaling in the application layer in order to carry out seamless handover operation. In one implementation, the UE comprises a Wireless Cellular Access Technology (WCAT) interface (e.g. the LTE interface) connected to the access network and a Wireless Non-Cellular Access Technology (WNCAT) interface (e.g. the WLAN interface) connected to the access network.

The mobile device can comprise a processing resource and a memory resource storing machine readable instructions to cause the processing resource to transmit through an application layer a handover request to a PGW in the hybrid network. The handover request may request an access bearer for routing an IP data flow, e.g., IP Flow1 160, IP Flow2 162, IP Flow3 164, IP Flow4 180, IP Flow5 182, IP Flow6 184, etc. The requested bearer can be either a WCAT bearer (e.g. the LTE bearer) or a WNCAT bearer (e.g. the WLAN bearer). The WCAT interface and the WNCAT interface may have the same IP address. A bearer can be a logical tunnel for transmitting data traffics. All traffics between the UE and the PGW can be further grouped in IP flows inside these bearers based on the general characteristics of flows, such as source IP address, source port, destination IP address, destination port, and protocol (e.g., a 5-tuple item), etc. The processing resource may route the IP flows through the requested bearer in either a LTE network 150 or a WLAN network 170 if the request is granted to the PGW, and receive the IP flows through the requested bearer if the request is granted from the PGW.

The example PGW deployed in the hybrid network can provide connectivity from a user equipment (UE) to an external packet data network, such as, Internet by being the point of exit and entry of traffic for the UE. The PGW can perform, e.g., policy enforcement, packet filtering, charging support, lawful interception, and packet screening. Moreover, the example PGW can handle seamless handover of IP flows in the hybrid network.

Trigger component 120 generally controls when the handover operation shall take place, what network conditions trigger the handover operation, which of the multiple access networks (e.g., a WLAN, a LTE, or a WiMAX) is to be used for data transfer, how many IP flows shall be designated to each access network, e.g., when a subset of the IP flows are designated to the WLAN while others being designated to the LTE, etc. After the handover is triggered by trigger component 120, the flow rule generator 130 generates a set of IP flow rules. Moreover, for each IP flow rule, flow rule enforcer 140 needs to provision the IP flow rule, which can be a tedious and inefficient process. In addition, when the flow amount changes at a further point of time, new flow conditions shall be enforced by flow rule enforcer 140 all over again.

The PGW can comprise logical sub-components that maintain the traffic paths used during seamless handover. In an example implementation, the PGW can comprise a processing resource and a memory resource storing machine readable instructions to cause the processing resource to receive in an application layer from the UE the handover request in the hybrid network. The handover request may request a bearer for uplink routing of an IP flow.

Generally, different IP flows are treated equally without considering their unique characteristics, such as, how best effort flows shall be handled other than non-best effort ones. In order to enhance best effort IP flow transmission, acceleration approaches can be used.

One example of such acceleration approaches is Multi-path Transmission Control Protocol (MPTCP). However, to use MPTCP, both peers of the TCP connection shall support the MPTCP capability. If any one of the peers fails to support the MPTCP, the connection will be established as a normal TCP. Moreover, implementing the MPTCP needs the modification on the UE's TCP/IP protocol stack implementation. Also, the MPTCP cannot split flows on an IP flow basis, for example, by allowing the TCP segments of the same IP flow to be transmitted on WLAN or LTE. Further, the MPTCP is unaware of flow characteristics, e.g., whether a flow is quality of service (QoS) sensitive.

Another acceleration approach may use the reflection mode for best effort transmission in multiple flows under IFOM based enterprise access networks. The use of reflection mode aims at increasing available network bandwidth and accelerating the transmission speed for best effort applications. Specifically, in the reflection mode, the PGW uses a simplified signaling to identify best effort IP flows, and directly reacts on the uplink flow characteristics to arrange the downlink flows.

For illustration purposes only, a download process is described herein because best effort applications are often applicable to the download scenarios. However, the reflection mode could also apply to the upload process in the same manner by treating the traffics in uplink and downlink reversely.

The processing of IP flows by the PGW in the reflection mode mimics lights reflected by mirrors. Thus, the PGW will determine characteristics of uplink IP flows from the UE (e.g., IP Flow1 160, IP Flow2 162, IP Flow3 164, IP Flow4 180, IP Flow5 182, IP Flow6 184, etc.). Then, based on the incoming paths of the uplink IP flows (e.g., from an LTE network or a WLAN network), the PGW determines the characteristics of the corresponding downlink IP flows from PGW to another network node. For example, if the uplink IP flows (e.g., IP Flow1 160, IP Flow2 162, IP Flow3 164, etc.) are received via LTE network 150, then the PGW will arrange the corresponding downlink IP flows to be transmitted on LTE network 150. On the other hand, if the uplink IP flows (e.g., IP Flow4 180, IP Flow5 182, IP Flow6 184) are received via WLAN network 170, then the PGW will arrange the corresponding downlink IP flows to be transmitted on WLAN network 170.

User Equipment (UE) in the Reflection Mode

Figure 2A:
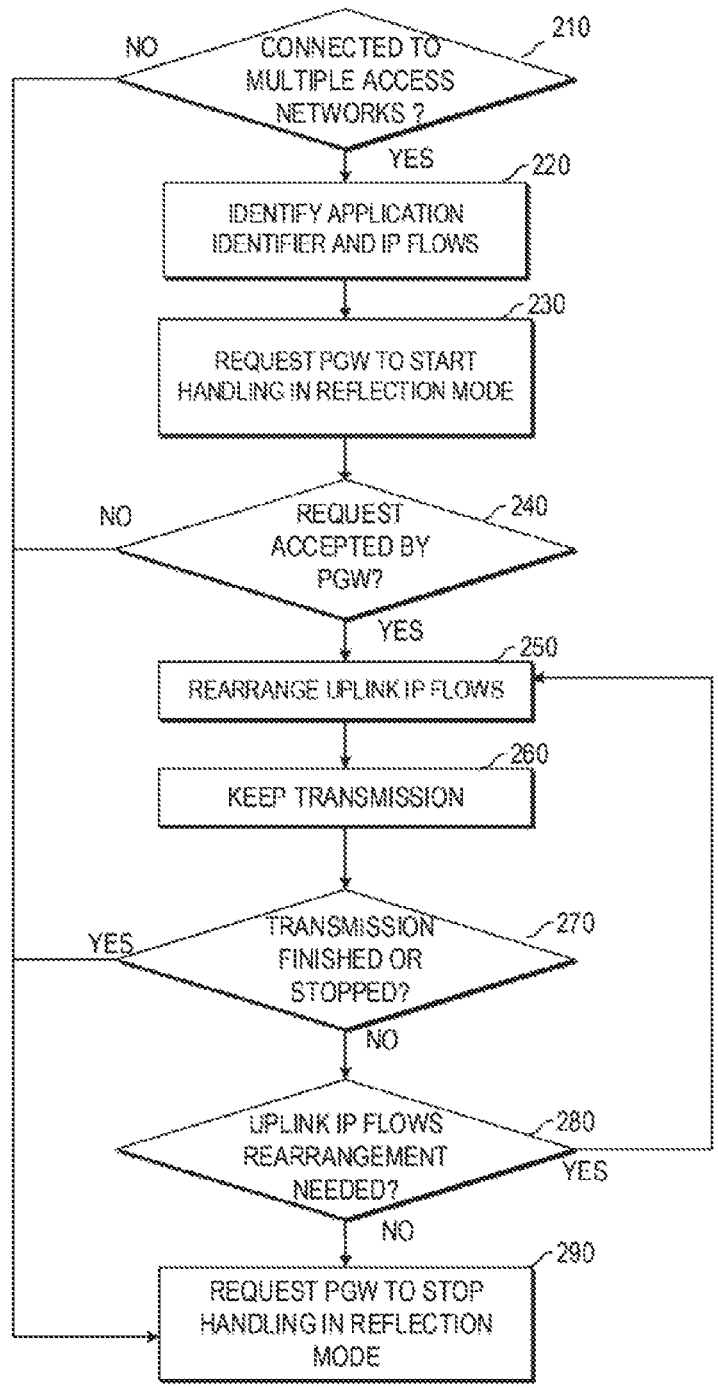
FIGS. 2A-2B are block diagrams illustrating example workflows of a user equipment using the reflection mode.
Figure 2B:
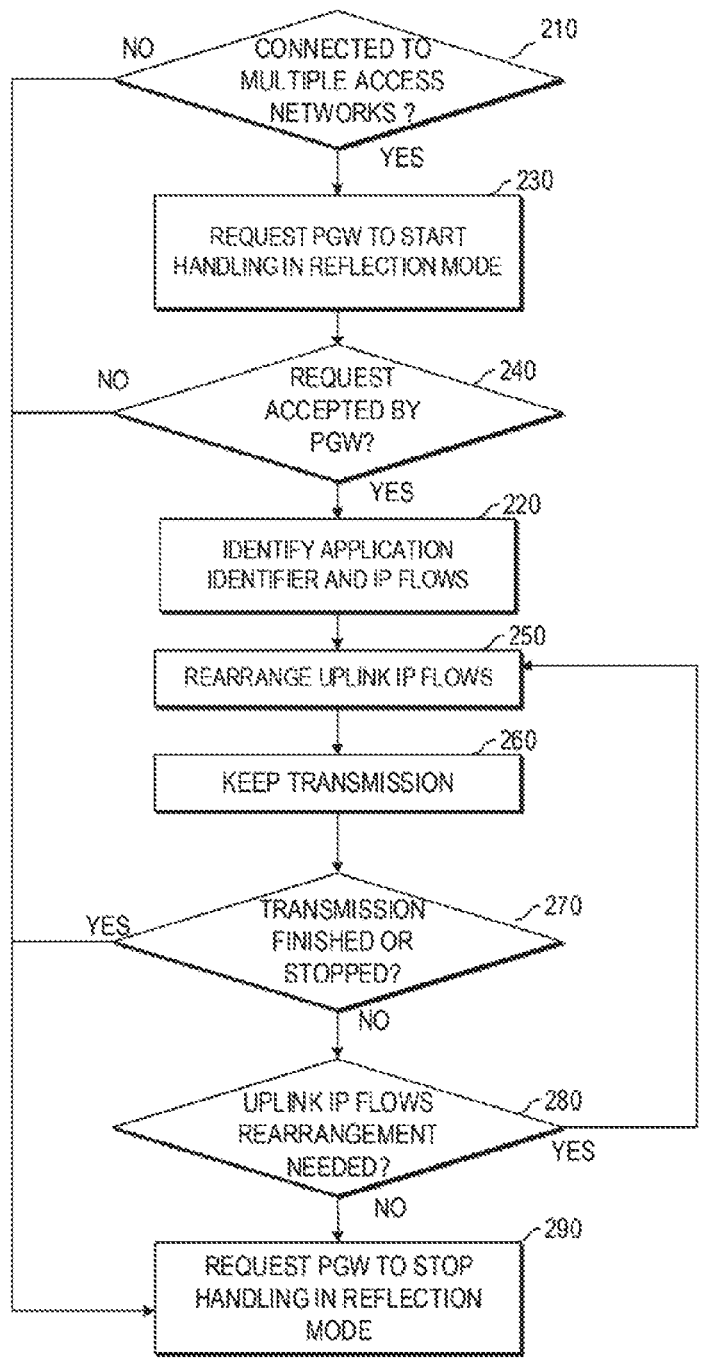

FIGS. 2A-2B are block diagrams illustrating example workflows of a user equipment using the reflection mode. Specifically, in order to use the reflection mode at the PGW, the UE shall determine whether the UE is connected to multiple access networks (e.g., both WLAN and LTE are connected under an IFOM network) (operation 210). If the UE is connected to a single access network, the UE will not able to request the PGW to start handling the IP flows in the reflection mode.

In the examples illustrated in FIG. 2A, if the UE is connected to multiple access networks, the PGW then identify an application identifier and IP flows (operation 220). This is an optional operation that can also be performed after the UE determines that the request to the PGW to start handling in the reflection mode has been accepted by the PGW as illustrated in FIG. 2B. If no application is specified (i.e., the application identifier cannot be identified), all IP flows on the UE will be considered.

Figure 3:
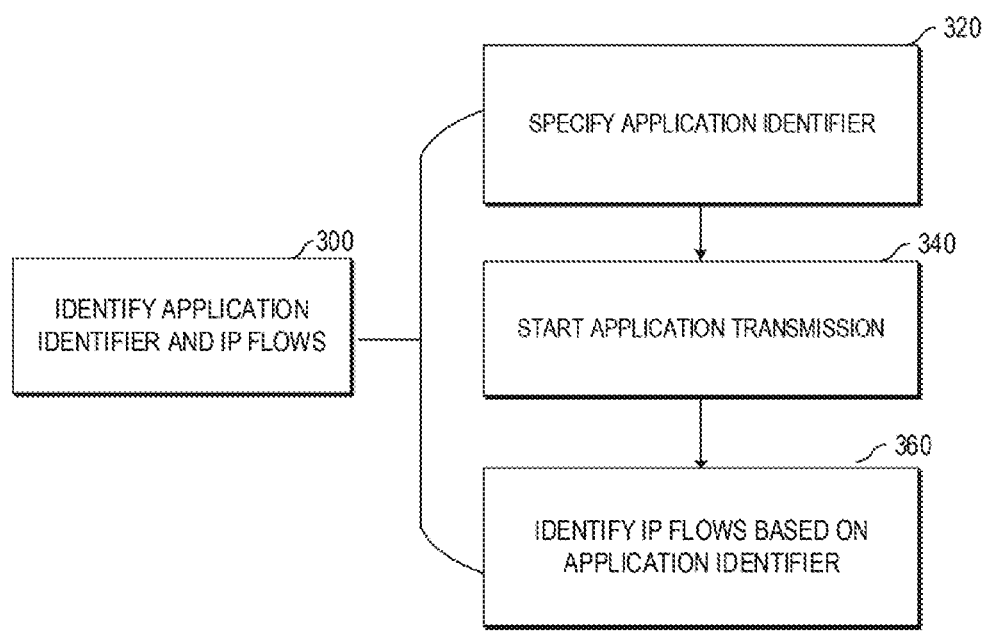
FIG. 3 is a block diagram illustrating an example identification of application and IP flows.

Referring now to FIG. 3, in an example identification of application and IP flows (operation 300), the UE may first specify an application number (operation 320). Then, the UE can start application transmission (operation 340). Next, the UE identifies the IP flows based on the application number (operation 360). Note that, only the specifically identified IP flows associated with a particular application as identified by the application identifier will be handled in the reflection mode. The identification of the application identifier and IP flows can be configured either manually or automatically. In some implementations, the application identifier and IP flows are identified on a temporary basis. In other implementations, the application identifier and IP flows are identified permanently.

Moreover, the UE requests the PGW to start handling the IP flows in the reflection mode (operation 230). The UE then listens for a response from the PGW to determine whether the request is accepted by the PGW (operation 240). If the request is not accepted by the PGW, the UE will not able to request the PGW to start handling the IP flows in the reflection mode.

If the request is accepted by the PGW, the PGW will start listening for the uplink IP flows from the UE. For any newly detected uplink flow, the PGW will add a corresponding downlink IP flow according to the type of the access network on which the uplink transmission occurs. Moreover, if any changes of uplink IP flows (e.g., from transmission on a WLAN to transmission on an LTE), the PGW will adjust the corresponding downlink IP flow.

In some implementations, the manner of detection and the interval of detection by the PGW could be determined on a per-packet basis. Thus, the PGW could react to the changes immediately or after a small interval. In some implementation, the PGW can negotiate the manner of detection and the interval of detection with the UE during the handling of the reflection request.

Next, the UE rearranges the uplink IP flows to split the different IP flows to different access networks (operation 250). For example, an application may generate five IP flows and the UE is connected to both the WLAN and the LTE network. As a result, three IP flows could be arranged to be transmitted on the WLAN, and the other two IP flows could be arranged to be transmitted on the LTE network. The decision of which IP flow is transmitted on the LTE or WLAN could be based on a variety of factors, including but not limited to, a balanced bandwidth, a random basis, cost saving, power conservation, etc.

Because each TCP connection establishment starts with a three-way handshake, the TCP ACK segments will be transferred between peers during TCP communications. As a result, the TCP ACK segments could be used by the UE to indicate to the PGW to rearrange the uplink IP flows using the reflection mode. Rearrangement of the uplink IP flows could also be based on specific implementations.

Then, the UE keeps transmission to the PGW (operation 260). The UE also determines whether the transmission is finished or stopped (operation 270). If so, the UE will request the PGW to stop handling the transmission in the reflection mode (operation 290).

On the other hand, if the transmission is ongoing, the UE will detect whether any change of the uplink IP flows (e.g., from transmission on a WLAN to transmission on an LTE) has occurred. If so, the UE further determines whether the uplink IP flows need rearrangement (operation 280). For example, an uplink IP flow that is initially transmitted on the LTE network may be rearranged to be transmitted on the WLAN when the UE detects a change in the uplink IP flow. If this is the case, the UE will rearrange uplink IP flows (operation 250) and repeat the process until the transmission is complete and no more uplink IP flows need rearrangement. Then, the UE will request the PGW to stop handling the transmission in the reflection mode (operation 290).

Although the above figures illustrate only the downloading scenarios via the application, the uploading scenarios can be applied using the reflection mode as well. Specifically, to achieve higher transmission speed in the uploading scenario, traffics in the uplink would need the increased bandwidth, and traffics in the downlink will handle the TCP ACK segments from remote host to UE. Furthermore, the uploading scenario, the UE rearranges the uplink IP flows as in operation 250. The PGW redirects the packets (e.g., the TCP ACK segments) to the UE through the same access network on which the uplink IP flows are transmitted.

Furthermore, although best effort transmissions in UDP are relatively less common than best effort transmissions in TCP, UDP transmissions could also be applied using the reflection mode. Since UDP transmission generally occurs in a single direction without any acknowledgement packet in the reverse direction, the UE in the reflection mode could notify the peer of any rearrangement by a set of signaling messages. The signaling messages may indicate traffics from the UE to a remote host will be rearranged by the UE. Accordingly, traffics from the remote host to UE will be rearranged by the PGW based on the UE's signaling.

With the processing logics mentioned above, operations in the reflection mode enable multiple IP flows to be arranged and routed on access networks (e.g., WLAN, LTE, WiMAX, etc.) in a timely manner without tedious enforcement of IP flow rules. Moreover, it adopts simple real time signaling at application level for reflection operations between the UE and the PGW. During the entire transmission, the session continuity could be maintained.

PDN Gateway (PGW) in the Reflection Mode

Figure 4:
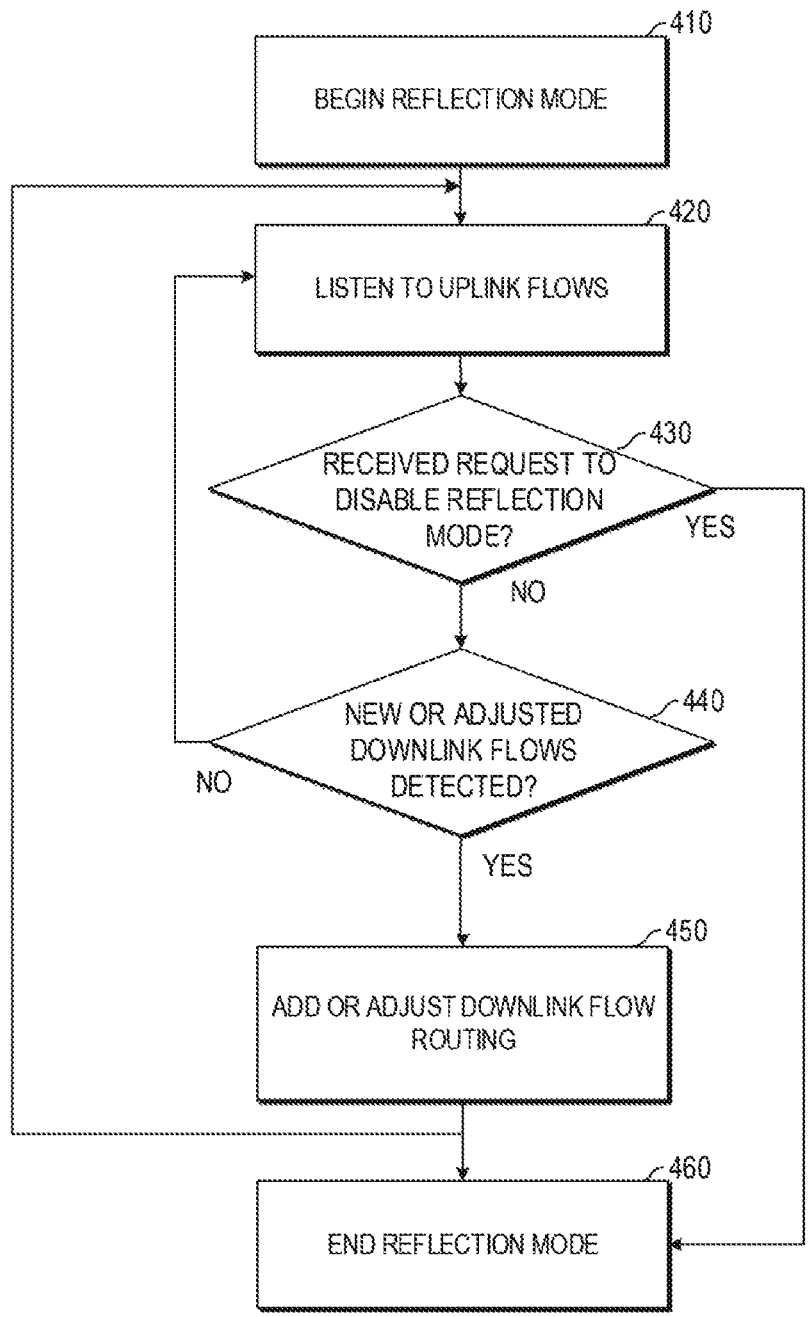
FIG. 4 is a block diagram illustrating an example workflow of a PGW using the reflection mode.

FIG. 4 is a block diagram illustrating an example workflow of a PGW using the reflection mode. Specifically, when the PGW receives a request from an UE to handle the transmission in the reflection mode and decides to accept the request, the PGW begins processing in the reflection mode (operation 410). As described above, the reflection mode may be applied to only a subset of IP flows that are associated with a specific application as identified by a user-specified application identifier.

The PGW then listens to the uplink IP flows (operation 420). Next, the PGW determines whether it has received a request from the UE to disable the reflection mode (operation 430). If so, the PGW ends the reflection mode (operation 460). Otherwise, the PGW proceeds to determine whether any new or adjusted downlink IP flows are detected (operation 440). If not, the PGW continues to listen to the uplink IP flows (operation 420). If the PGW detects a new or adjusted downlink IP flow, the PGW will add or adjust the downlink IP flow routing accordingly (operation 450). For example, if the PGW detects that the transmission of the downlink IP flow from another network node to the PGW is changed from the LTE network to the WLAN, the PGW will adjust the downlink IP flow from the PGW to the UE to be transmitted on the WLAN accordingly. If the PGW detects that the transmission of the downlink IP flow from another network node to the PGW is changed from the WLAN to the LTE or WiMAX, the PGW will adjust the downlink IP flow from the PGW to the UE to be transmitted on the LTE or WiMAX.

FIG. 5 is a block diagram illustrating example operations by the PGW in the reflection mode. In the demonstrated scenario, a commercial downloading application is installed on an UE with the IP address of 192.168.1.103 to download two large files from two Internet URLs, e.g., http://192.168.1.10/miso.zip and http://192.168.1.10/miso2.zip. The downloading application dynamically creates between one to five threads in parallel for each downloading task, which corresponds to a particular URL. Each thread may terminate after a few seconds when it finishes its sub-task. Throughout this demonstration, there may be several hundreds of threads being created and terminated.

Specifically, during this particular demonstration, the commercial downloading application creates a plurality of downloading tasks under the WLAN initially. Then, after downloading of the two large files started, several other threads are created. Each thread corresponds to an IP flow. Also, each thread only downloads a small part of the file, and terminates after it finishes its job. Once a thread terminates after finishing its job, a new thread is created to download another small part of the file. Assuming that the commercial application supports a maximum of five parallel threads, the status of each thread at real time is shown in FIG. 5. Note the thread status table 500 is updated dynamically throughout the demonstration. Therefore, the PGW will observe that some threads are terminated; some threads are still alive; and some threads are newly created.

When the PGW uses the reflection mode in response to the request from the UE, the IP flows on the UE can be retrieved based on the application identifier. For illustration purposes, the detected IP flows are rearranged into two groups, e.g., one group is rearranged to be transmitted on the WLAN uplink, and the other group is rearranged to be transmitted on the LTE uplink. As shown in FIG. 5, thread #1 and thread #2 are rearranged to be transmitted on the LTE uplink 510, whereas thread #3 and thread #4 are rearranged to be transmitted on the WLAN uplink 530. Accordingly, the PGW redirects the downlink transmissions corresponding to thread #1 and thread #2 to be the LTE network 520. Similarly, the PGW redirects the downlink transmissions corresponding to thread #1 and thread #2 to be the WLAN 540. After all files have been downloaded, all threads will be terminated. A request will be sent from the UE to the PGW to disable the operations in the reflection mode.

When the transmission speed in the WLAN alone is compared to the transmission speed using both LTE and WLAN in the reflection mode, it can be easily observed that the download speed in the reflection mode is higher than that in the WLAN only. Moreover, the reflection operations can be achieved without breaks and delays during the downloading process, even though there are hundreds of different IP flows created by the application. These results show that using the reflection mode at the PGW is capable of accelerating the best effort transmission under enterprise access networks. The PGW using the reflection mode handles the IP flow acceleration by routing the IP flow packets to the downlink based on the IP flow's uplink characteristics.

Moreover, using the reflection mode has the additional advantages of increasing bandwidth by using multiple access network interfaces for data transfer simultaneously. The acceleration operations can be achieved without network delays, which brings no extra signaling burden to the UE during network transmissions. Also, using the reflection mode at the PGW can be on-demand operations with extensibility. The real-time signaling at an application level allows for flexible implementations, and could be applied to various network policies and scenarios. The solution is easy to upgrade and maintain. It is also easy for traditional IP flow mobility based enterprise access network infrastructure to operate in the reflection mode by installing a lightweight application on the UE.

Process of Generating a Set of Rules Using Reflection Mode

Figure 6:
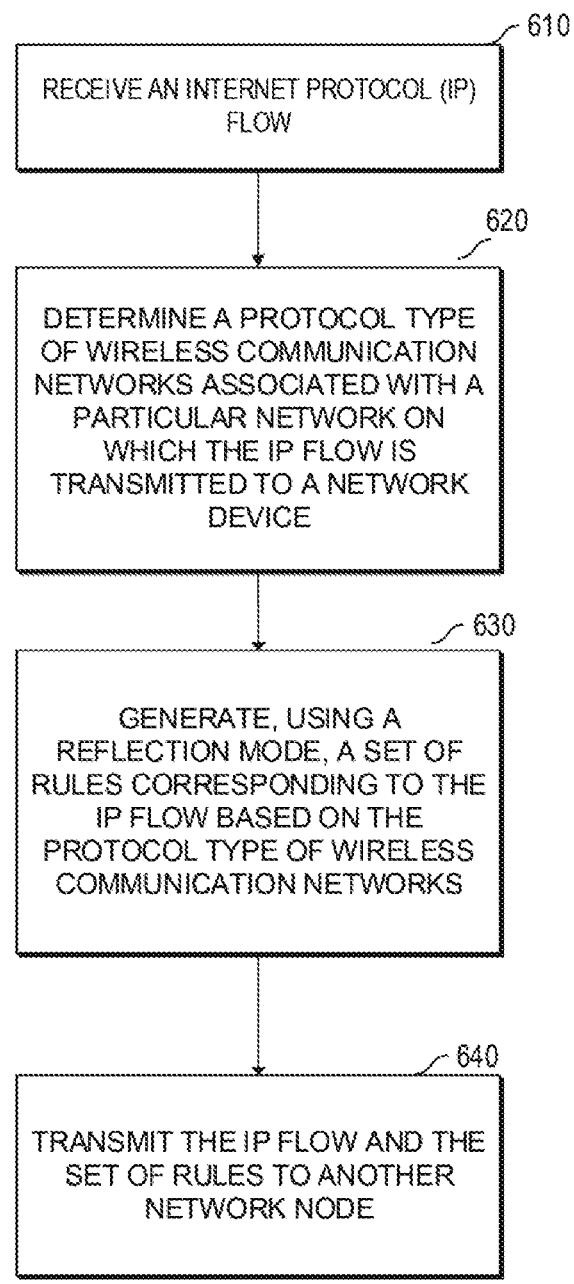
FIG. 6 is a flowchart of an example process of generating a set of rules corresponding to an IP flow using the reflection mode.

FIG. 6 is a flowchart of an example process of generating a set of rules using the reflection mode. Specifically, FIG. 6 begins when a disclosed PGW device receives an Internet Protocol (IP) flow (operation 610). The disclosed PGW device then determines a protocol type of wireless communication networks associated with a particular network on which the IP flow is transmitted to the PGW device (operation 620). Next, the disclosed PGW device, using a reflection mode, generates a set of rules corresponding to the IP flow based on the protocol type of the wireless communication networks (operation 630). Then, the disclosed PGW device transmits the IP flow and the set of rules to another network node (operation 640).

Here, the disclosed PGW device can comprises any packet data network (PDN) gateway (PGW) between a user equipment and a network node. Also, the user equipment (UE) communicates with the Internet using a plurality of wireless communication network protocols on an enterprise access network. The protocol type of wireless communication networks may include, but is not limited to, a wireless local area network (WLAN), a Long-Term Evolution (LTE) network, and a Worldwide Interoperability for Microwave Access (WiMAX).

In some implementations, the IP flow is an uplink IP flow transmitted from the user equipment to the PGW. Accordingly, the generated rules are based on the protocol type of the wireless communication of the uplink IP flow. The IP flow and the set of rules will be transmitted from PGW to an uplink network device.

In some implementations, the IP flow is a downlink IP flow transmitted from another network device (also referred to as a remote host) to the PGW. Accordingly, the generated rules are based on the protocol type of the wireless communication of the downlink IP flow. The IP flow and the set of rules will be transmitted from PGW to the UE.

In some implementations, using the reflection mode involves generating the set of rules corresponding to the IP flow at least by designating the protocol type in each rule to be the specific protocol type, in response to determining that the protocol type of the particular network on which the IP flow is transmitted from the user equipment to the PGW is a specific protocol type.

The set of rules may comprise a plurality of inter-system routing policies (ISRPs). Each of the set of rules may include an IP address and a port address associated with the user equipment or destination; an action; a flow identifier; a priority; and a protocol type; etc.

In some implementations, the PGW device further receives a plurality of IP flows associated with a particular application identifier. In addition, the PGW device determines a first protocol type associated with a first network on which a first subset of the plurality of IP flows are transmitted from the user equipment to the PGW, and a second protocol type associated with a second network on which a second subset of the plurality of IP flows are transmitted from the user equipment to the PGW. Here, the second subset comprises IP flows that do not belong to the first subset. Then, the disclosed PGW device transmits the first subset of the plurality of IP flows associated with the particular application identifier on the first network from PGW to the uplink network device, and transmits the second subset of the plurality of IP flows associated with the particular application identifier on the second network from PGW to the uplink network device.

In some implementations, the disclosed PGW device further accepts a reflection request from a user equipment for using the reflection mode. The disclosed PGW device then listens for traffic to or from the user equipment. Specifically, while operating in the reflection mode, the disclosed PGW device may determine whether the protocol type of the IP flow has changed to a new protocol type. In response to the protocol type of the IP flow being changed, the disclosed PGW device can designate the new protocol type to be associated with a corresponding IP flow originated from the PGW.

Machine Readable Storage Medium to Generate a Set of Rules Using Reflection Mode Certain implementations of the present disclosure also may be embedded in a non-transitory computer-readable storage medium (e.g., a programmable circuit; a semiconductor memory such as a volatile memory such as random access memory "RAM," or non-volatile memory, such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Figure 7:
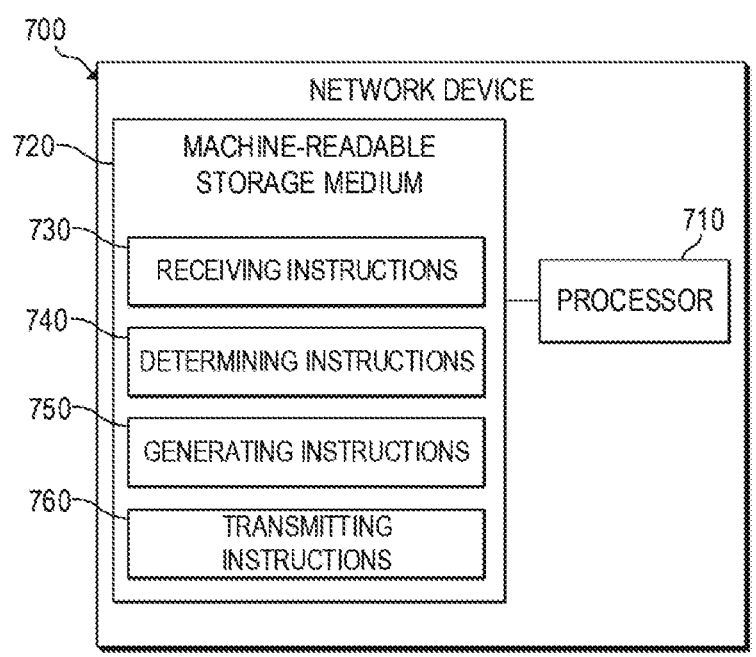
FIG. 7 is a block diagram of an example network device to generate a set of rules corresponding to an IP flow using the reflection mode.

FIG. 7 is a block diagram of an example network device to generate a set of rules using reflection mode. Specifically, network device 700, acting as a packet data network gateway (PGW) generally includes a device suitable for generating a set of rules for best effort transmissions in an IP flow mobility based enterprise access network. As illustrated in FIG. 7, network device 700 includes at least one hardware processor 710 and a machine-readable storage medium 720.

Processor 710 may be central processing units (CPUs), CPU cores, semiconductor-based microprocessors, and/or other hardware devices suitable for retrieval and execution of instructions stored in machine-readable storage medium 720. Processor 710 may fetch, decode, and execute one or more of instructions 730-760 to generate and provision rules for IP flow transmissions. As an alternative or in addition to retrieving and executing instructions, processor 710 may include one or more electronic circuits that include electronic components for performing the functionality of one or more of instructions 730-760.

Specifically, the at least one processor 710 executes instructions 730-760 to: receive an Internet Protocol (IP) flow; receive a plurality of IP flows associated with a particular application identifier; determine a protocol type of wireless communication networks associated with a particular network on which the IP flow is transmitted to the network device; generate, using a reflection mode, a set of rules corresponding to the IP flow based on the protocol type of wireless communication networks; transmit the IP flow and the set of rules to another network node; determine a first protocol type associated with a first network on which a first subset of the plurality of IP flows are transmitted from a user equipment to a PGW; determine a second protocol type associated with a second network on which a second subset of the plurality of IP flows are transmitted from the user equipment to the PGW, wherein the second subset comprises IP flows that do not belong to the first subset; transmit the first subset of the plurality of IP flows associated with the particular application identifier on the first network from PGW to the uplink network device; transmit the second subset of the plurality of IP flows associated with the particular application identifier on the second network from PGW to the uplink network device; accept a reflection request from a user equipment for using the reflection mode; listen for traffic to or from the user equipment; determine whether the protocol type of the IP flow has changed to a new protocol type; designate the new protocol type to be associated with a corresponding IP flow originated from the PGW in response to the protocol type of the IP flow being changed; etc.

Machine-readable storage medium 720 may be any electronic, magnetic, optical, or other physical storage device that contains or stores executable instructions. Thus, machine-readable storage medium 720 may be, for example, Random Access Memory (RAM), an Electrically Erasable Programmable Read-Only Memory (EEPROM), a storage device, an optical disc, and the like. In some implementations, machine-readable storage medium 720 may be a non-transitory storage medium, where the term "non-transitory" does not encompass transitory propagating signals.

What is claimed is:

1. A network device as a packet data network (PDN) gateway (PGW) comprising:
  a hardware processor;
  a memory storing machine readable instructions to cause the hardware processor to:
  receive an Internet Protocol (IP) flow from a user equipment;
  determine a protocol type of wireless communication networks associated with a particular network on which the IP flow is transmitted from the user equipment to the PGW;
  generate, using a reflection mode, a set of rules corresponding to the IP flow based on the protocol type of the wireless communication networks; and transmit the IP flow and the set of rules from the PGW to an uplink network device.

2. The network device of claim 1, wherein the protocol type of the wireless communication networks comprises one of a wireless local area network (WLAN), a Long-Term Evolution (LTE) network, and a Worldwide Interoperability for Microwave Access (WiMAX) network.

3. The network device of claim 2, wherein using the reflection mode includes:
in response to determining that the protocol type of the particular network on which the IP flow is transmitted from the user equipment to the PGW is a specific protocol type, generating the set of rules corresponding to the IP flow at least by designating the protocol type in each rule to be the specific protocol type.

4. The network device of claim 1, wherein the set of rules comprises a plurality of inter-system routing policies (IS-RPs).

5. The network device of claim 1, wherein each of the set of rules comprises: an IP address and a port address associated with the user equipment or destination; an action; a flow identifier; a priority; and a protocol type.

6. The network device of claim 1, wherein the machine readable instructions further to cause the hardware processor to:
receive a plurality of IP flows associated with a particular application identifier;
determine a first protocol type associated with a first network on which a first subset of the plurality of IP flows are transmitted from the user equipment to the PGW;
determine a second protocol type associated with a second network on which a second subset of the plurality of IP flows are transmitted from the user equipment to the PGW, wherein the second subset comprises IP flows that do not belong to the first subset;
transmit the first subset of the plurality of IP flows associated with the particular application identifier on the first network from PGW to the uplink network device; and
transmit the second subset of the plurality of IP flows associated with the particular application identifier on the second network from PGW to the uplink network device.

7. A network device as a packet data network (PDN) gateway (PGW) comprising:
a hardware processor;
a memory storing machine readable instructions to cause the hardware processor to:
receive an Internet Protocol (IP) flow from a first network node;
determine a protocol type of wireless communication networks associated with a particular network on which the IP flow is transmitted to the network device;
generate, using a reflection mode, a set of rules corresponding to the IP flow based on the protocol type of the associated wireless communication networks; and
transmit the IP flow and the set of rules to a second network node.

8. The network device of claim 7, wherein the protocol type of the wireless communication networks comprises one of a wireless local area network (WLAN), a Long-Term Evolution (LTE) network, and a Worldwide Interoperability for Microwave Access (WiMAX) network.

9. The network device of claim 8, wherein using the reflection mode comprises:
accepting a reflection request from a user equipment for using the reflection mode;
listening for traffic to or from the user equipment;
determining that the protocol type of the particular network on which the IP flow is transmitted is a specific protocol type; and
generating the set of rules corresponding to the IP flow at least by designating the protocol type in each rule to be the specific protocol type.

10. The network device of claim 7, wherein the IP flow is received from an uplink network device and destined to a user equipment, and wherein the user equipment is connected to a first network associated with a first protocol type and to a second network associated with the second protocol type.

11. The network device of claim 10, wherein machine readable instructions further to cause the hardware processor to:
receive a plurality of IP flows associated with a particular application identifier;
determine the first protocol type associated with the first network on which a first subset of the plurality of IP flows are transmitted from the user equipment to the PGW;
determine the second protocol type associated with the second network on which a second subset of the plurality of IP flows are transmitted from the user equipment to the PGW, wherein the second subset comprises IP flows that do not belong to the first subset;
transmit the first subset of the plurality of IP flows associated with the particular application identifier on the first network from PGW to the uplink network device; and
transmit the second subset of the plurality of IP flows associated with the particular application identifier on the second network from PGW to the uplink network device.

12. The network device of claim 7, wherein using the reflection mode comprises:
determining whether the protocol type of the IP flow has changed to a new protocol type; and
in response to the protocol type of the IP flow being changed, designating the new protocol type to be associated with a corresponding IP flow originated from the PGW.

13. A method comprising:
receiving, by a network device, an Internet Protocol (IP) flow;
determining, by the network device, a protocol type of wireless communication networks associated with a particular network on which the IP flow is transmitted to the network device;
generating, by the network device, a set of rules corresponding to the IP flow based on the protocol type of the associated wireless communication networks using a reflection mode; and
transmitting, by the network device, the IP flow and the set of rules to another network node while maintaining session continuity during transmission of the IP flow.

14. The method of claim 13, wherein the network device comprises a packet data network (PDN) gateway (PGW) between a user equipment and a network node, and wherein the user equipment communicates with the Internet using a plurality of wireless communication network protocols.

15. The method of claim 14, wherein the user equipment transmits a plurality of uplink IP flows to the PGW using a plurality of protocol types based on one of a balanced bandwidth, a random basis, a cost saving measure, and a power conservation.

\* \* \* \* \*